Feb. 4, 1947.  W. A. LEDWITH  2,415,104
TURBINE FOR AIRCRAFT
Filed May 11, 1943   2 Sheets-Sheet 2

INVENTOR
Walter A. Ledwith
Charles P. Warren
ATTORNEY

Patented Feb. 4, 1947

2,415,104

UNITED STATES PATENT OFFICE 2,415,104

TURBINE FOR AIRCRAFT

Walter A. Ledwith, Hartford, Conn., assignor to United Aircraft Corporation, East Hartford, Conn., a corporation of Delaware Application May 11, 1943, Serial No. 486,620

8 Claims. (Cl. 253—69)

In stationary installations a turbine generally has a heavy housing resting on a base. For aircraft use, however, where weight limitations are imposed, the weight of the turbine is reduced to a minimum. As a result, the housing, which must be mounted in a part of the aircraft structure, does not have the conventional shape for mounting on a base. An object of this invention is to mount a turbine in an aircraft structure without adding materially to the weight of the turbine.

For weight reduction, the turbine housing may be cylindrical with all excess weight for mounting structure removed. A feature of this invention is the mounting of a turbine of this character in a supporting structure.

Another feature is an arrangement of several mounting brackets in a ring around a turbine housing. The mounting brackets engage a supporting structure which may form a part of the frame of an aircraft.

The turbine may be constructed with an outer housing having a row of radially extending pins which support the turbine casing within the housing. Another feature of this invention is the arrangement of the mounting brackets on the housing in a ring substantially in the same plane as the casing-supporting pins.

Other objects and advantages will be apparent from the specification and claims, and from the accompanying drawings which illustrate what is now considered to be a preferred embodiment of the invention.

Figure 1:
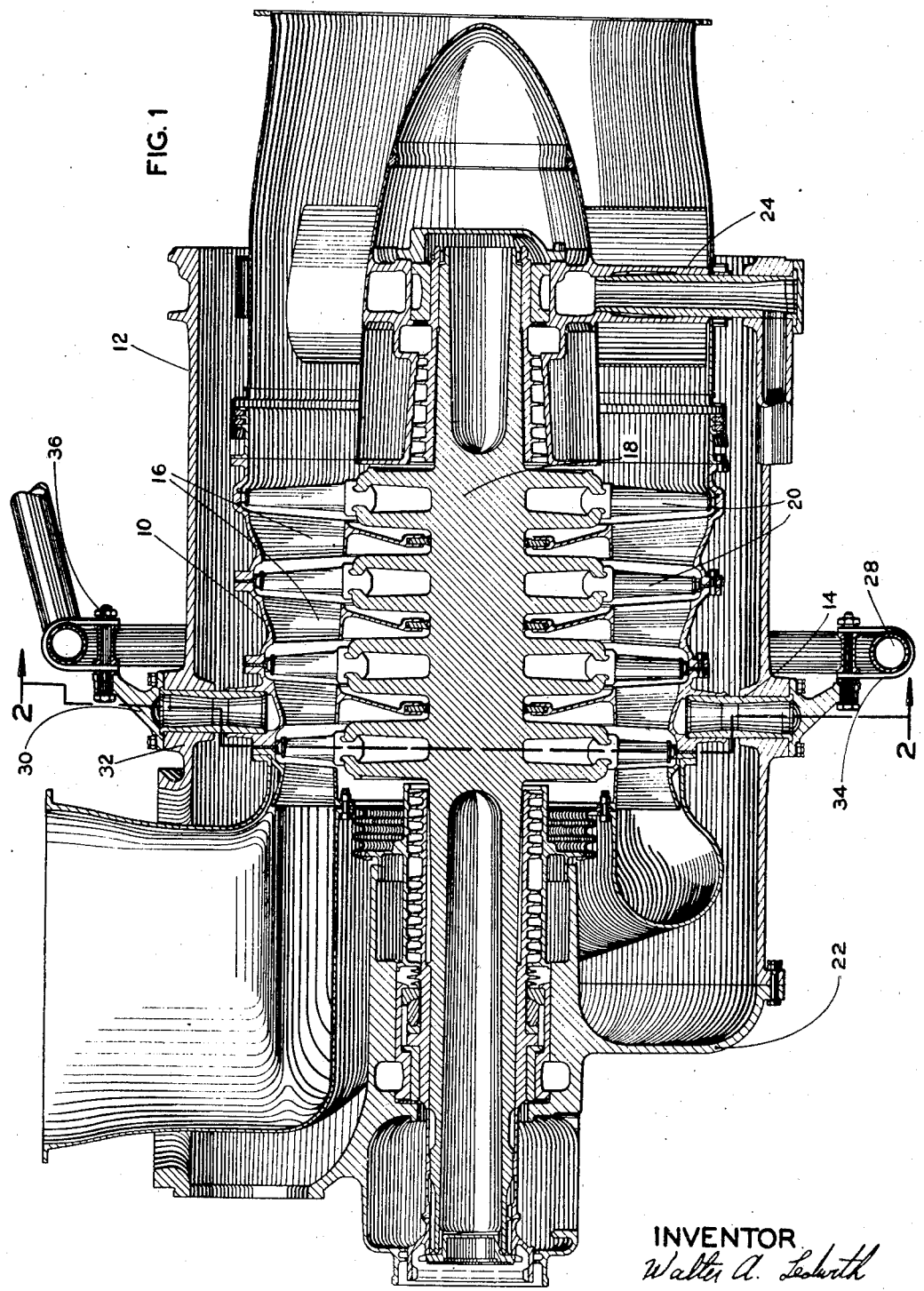
Fig. 1 is a sectional view through the turbine.

The turbine includes a casing 10 supported in a housing 12 by radially extending pins 14. These pins extend through bores in the housing and engage aligned bores in the casing. These pins are all in substantially the same plane and support the casing so that it is free to expand radially or axially.

Within the casing, which may have several rows of nozzle-forming vanes 16, is the turbine rotor 18 having rows of blades 20 alternating with rows of nozzles. The rotor is supported at one end by the head 22 which forms a part of the housing and at the other end by a spider 24 also supported by the housing.

Figure 2:
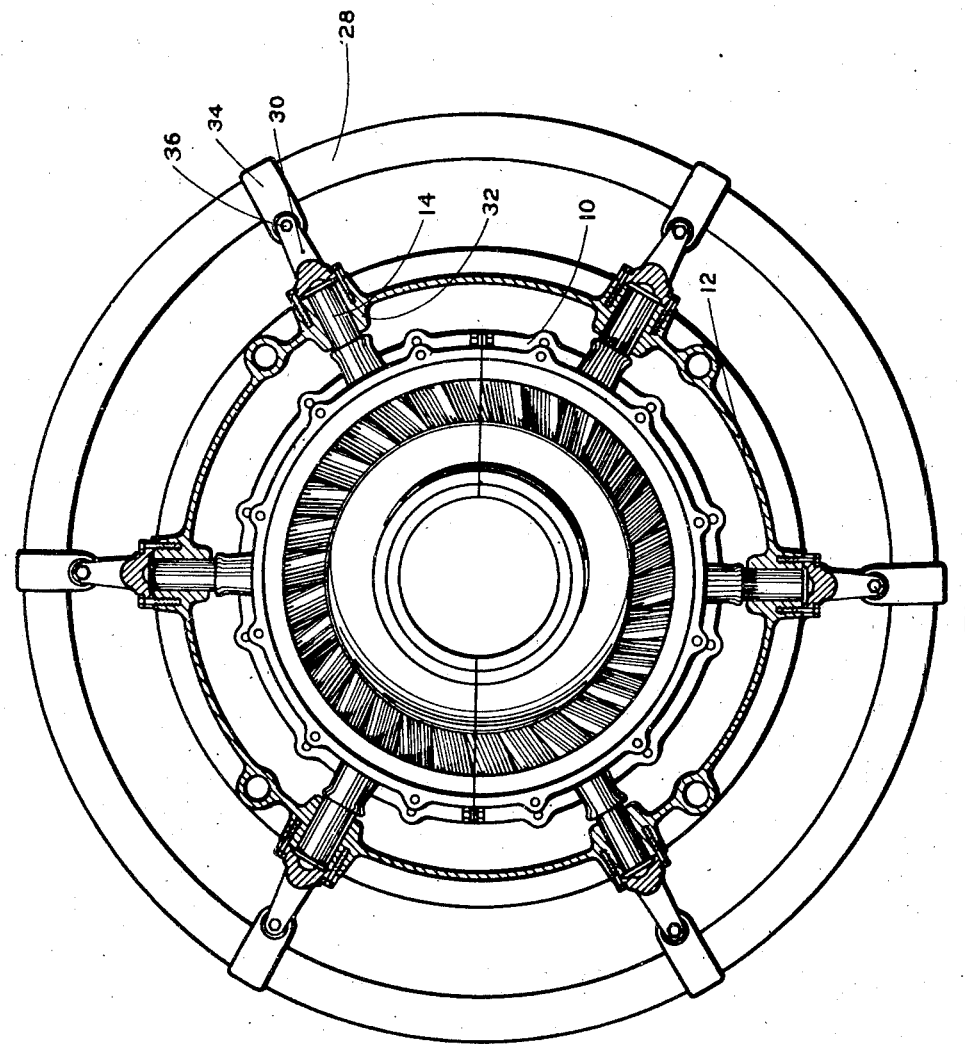
Fig. 2 is a transverse section of the casing and housing on line 2—2 of Fig. 1, showing the mounting brackets engaging a supporting structure.

As shown in Fig. 2 the turbine is adapted to be mounted in a supporting structure which may form a part of the frame of an aircraft. This structure may be in the form of a ring 28 through which the turbine extends. The turbine is supported in this structure by several brackets 30 arranged in a ring about the housing and attached to bosses 32 on the housing. These bosses are in the plane of the pins 14 and the bores in which the pins are positioned may extend through these bosses. The brackets may be attached to lugs 34 on ring 28 by bolts 36.

By this arrangement the brackets which support the housing are connected to the housing in substantially the plane of the pins which support the casing in the housing. This mounting is particularly adapted for supporting the cylindrical turbine housing within an aircraft where the turbine forms a part of the aircraft power plant.

It is to be understood that the invention is not limited to the specific embodiment herein illustrated and described, but may be used in other ways without departure from its spirit as defined by the following claims.

I claim:

1. In a turbine mounting for supporting the turbine in a structure having an opening for the turbine, the combination with a turbine housing, a casing within the housing and several radial pins supporting the casing within the housing, of brackets on said housing engaging the supporting structure, said brackets being mounted at the outer ends of some of the pins.

2. In a turbine mounting for supporting the turbine in a structure having an opening for the turbine, the combination with a turbine housing having several bosses in a ring around the housing, a casing within the housing and several radial pins supporting the casing in the housing, said pins being substantially in the plane of the bosses, of brackets on said bosses engaging the supporting structure.

3. In a turbine mounting for supporting the turbine in a structure having an opening for the turbine, the combination with a turbine housing having several bosses in a ring around the housing, a casing within the housing and several radial pins supporting the casing in the housing, said pins being substantially in the plane of the bosses, and the bosses extending around the outer end of certain of the pins, of brackets on said bosses engaging the supporting structure.

4. A turbine construction including a housing having several radial openings arranged in a radial plane, a casing within said housing, pins in said openings for supporting the casing from the housing, supporting brackets for the housing in a ring around the housing, said brackets being mounted on the housing adjacent to said pins, and supporting means with which the brackets engage.

5. A turbine construction including a housing having several radial openings arranged in a radial plane, a casing within said housing, pins in said openings for supporting the casing from the housing, several bosses integral with the housing and arranged around the housing, and supporting brackets on said bosses, said pins and bosses being substantially in the same radial plane, and supporting means with which the brackets engage.

6. A turbine construction including a housing having several radial openings arranged in a ring, a casing within said housing, pins in said openings for supporting the casing from the housing, several bosses arranged in the same ring around the housing, and supporting brackets on said bosses, said bosses surrounding certain of the openings in the housing, and supporting means with which the brackets engage.

7. In a turbine mounting for supporting the turbine in a structure having an opening for the turbine, the combination with a turbine housing, a casing within the housing, means arranged in a radial plane for supporting the casing within the housing, of brackets on said housing in substantially the plane of said means, said brackets engaging the supporting structure.

8. In a turbine mounting for supporting the turbine in a structure having an opening for the turbine, the combination with a turbine housing, a casing within the housing, means arranged in a radial plane for supporting the casing within the housing, said means constituting the sole support for the casing, of brackets on said housing in substantially the plane of said means, said brackets engaging the supporting structure.

WALTER A. LEDWITH.

REFERENCES CITED

The following references are of record in the file of this patent:

UNITED STATES PATENTS

| Number | Name | Date |
| --- | --- | --- |
| 1,554,230 | Pochobradsky | Sept. 22, 1925 |
| 1,723,012 | Caminez | Aug. 6, 1929 |
| 1,985,964 | Warren | Jan. 1, 1935 |
| 2,232,611 | Keller | Feb. 18, 1941 |
| 2,282,894 | Sheldon | May 12, 1942 |

FOREIGN PATENTS

| Number | Country | Date |
| --- | --- | --- |
| 76,744 | Austrian | June 10, 1919 |
| 369,680 | British | Mar. 31, 1932 |